March 28, 1961 C. M. NERWICK 2,977,269
MANUFACTURE OF IMPREGNATED GLASS FIBER TANKS
Filed June 27, 1958 4 Sheets-Sheet 1

INVENTOR.
CHARLES M. NERWICK
BY Ely, Pearne, Gordon
ATTORNEYS

INVENTOR.
CHARLES M. NERWICK
BY *Ely, Pearne & Gordon*
ATTORNEYS

March 28, 1961 C. M. NERWICK 2,977,269
MANUFACTURE OF IMPREGNATED GLASS FIBER TANKS
Filed June 27, 1958 4 Sheets-Sheet 4
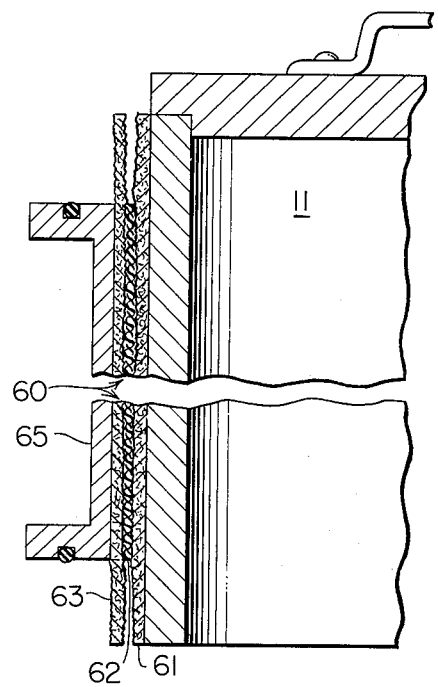
FIG. 9
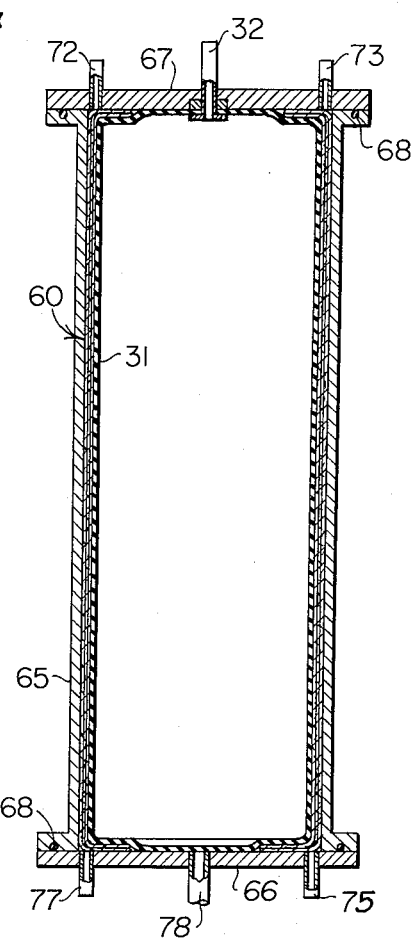
FIG. 12
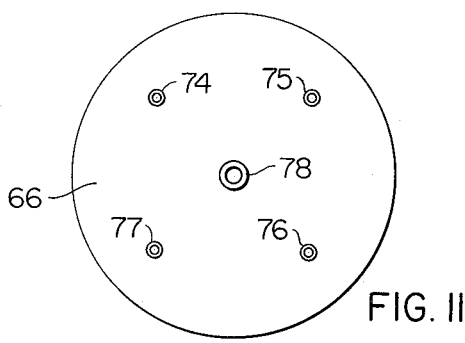
FIG. 10
FIG. 11
INVENTOR.
CHARLES M. NERWICK
BY
ATTORNEYS

2,977,269
Patented Mar. 28, 1961

2,977,269

MANUFACTURE OF IMPREGNATED GLASS FIBER TANKS

Charles M. Nerwick, Willoughby, Ohio, assignor to Structural Fibers, Inc., Chardon, Ohio, a corporation of Ohio Filed June 27, 1958, Ser. No. 745,093

9 Claims. (Cl. 154—83)

This invention relates to the manufacture of fiber-reinforced molded articles and, more particularly, to the fabrication of such articles by laying up porous, fibrous mats approximately in the shape of the article to be produced and impregnating them with a liquid which is subject to curing or setting by application of a setting agent such as heat, whereby a substantially homogeneous seamless article is achieved.

The invention constitutes an improvement in the method described and claimed in a copending application of Donald W. Randolph, Serial No. 577,487, filed April 11, 1956.

During recent years the manufacture of fiber-reinforced molded articles has been considerably stimulated because the balance between material costs and fabricating costs on the one hand and utility, strength and durability on the other hand has compared favorably with similar balances made in connection with older and more conventional methods and products.

One of the applications in which fiber-reinforced molded articles have long shown promise is in the manufacture of domestic water softener tanks and similar large, water-tight, and chemically resistant, hollow objects. However, progress in this particular field has been limited because of high costs and other disadvantages inherent in the fabrication of several subassemblies prior to final assembly and fabrication of the completed product. Attempts to form a large, integral one-piece unit in a single pressure molding or forming operation have not been successful due to the fugitive nature of fiber matting when it is confined and compressed between narrowly spaced walls between which conventional settable liquid resins are forced under pressure. For example, when sections of fiber matting are layed up in the approximate form of the desired object and encased in or backed up by an external rigid mold, between the mold surfaces and an expandable, fluid-filled bag or envelope, or other fluid-expanded memberane, for defining the shape of the finished article, and thereupon an impregnating liquid is forced through the matting to permeate it, the liquid acts as a lubricant, and the sections of matting tend to flow with the liquid, destroying the conformation of the layed-up matting. This problem has been particularly acute when the matting employed is made up of loosely felted, individual fibers (e.g. glass fiber matting). Even though the fibers have been sprayed with a light coating of liquid resin adhesive during the felting process so as to hold them together without significantly diminishing their porous loosely felted character, the individual fibers are by no means securely held in place in the matting structure. As a result, when the impregnating liquid is forced through such matting, the individual fibers, as well as whole sections of fiber matting, tend to migrate by flowing with the impregnating liquid.

These difficulties may be encountered when using felted fiber matting, alone or in combination with woven fiber matting or the like, even though an expandable bag, envelope or other flexible mebrane is held with considerable pressure against the matting as the impregnating liquid is forced therethrough. As the pressure used to hold the matting in place against a rigid mold surface is increased, the matting is compressed with a consequent reduction in its porosity, and greater pressures on the impregnating liquid are required to force it through the matting at the same rate. This pressure of the impregnating liquid opposes the mat holding effect of the increased membrane pressure, and the tendency of the individual fibers and the sections of fiber matting to migrate persists. In fact, where a gas is used as the pressurizing medium for maintaining a relatively high compressing pressure on the matting, the relatively high pressure of the impregnating liquid that is necessary to impregnate the matting tends to cause billowing of the membrane and, thus, may largely or completely eliminate the membrane pressure on the fiber matting in localized areas, with generally disastrous results. As a result, liquid has been used as the pressurizing fluid in accordance with the disclosure of the above mentioned copending application Serial No. 577,487 of Donald W. Randolph.

Permeation of fiber matting by an impregnating liquid has also been commonly accompanied by the entrapment of pockets of air within the interlaced fiber matting, resulting in the formation of voids in the final product. Such voids very seriously weaken the walls of the final product and render it useless. If, because of a relatively high compressing pressure on the fiber matting, it becomes necessary to use a very high pressure to force the impregnating liquid through the matting at a practical rate, the tendency to trap air in the body of the product increases. This is due to the fact that the expressing of the impregnating liquid through the highly compressed matting does not progress uniformly, and pockets containing air may be trapped between spaced apart, irregularly flowing streams of the resin and be surrounded with resin so that the air cannot escape. Thus, it is desirable to avoid such conditions by finding an expedient by which the matting may be held intact and in place without placing it under too high a compressing pressure during the liquid impregnation step.

According to the present invention, one-piece, fiber-reinforced, hollow tanks may be more successfully and economically pressure molded. Articles made according to the present invention are reinforced throughout with substantially evenly distributed matted fibers, in a manner to be described below. The entrapment of air and the formation of voids are eliminated. Wall thickness of the final product is substantially uniform. All portions of the final product are cast in one integral piece, including the end walls thereof.

The invention contemplates partially permeating the walls of a hollow form of layed-up fiber matting with a thermosetting resin or the like while the matting is under only slight pressure, and then progressively compressing the walls in such a manner as to distribute the resin throughout the matting and achieve the desired effects of pressure molding, while at the same time avoiding migration of the fibers and destruction of the layed-up fiber mats.

In general, the present invention is similar to the method disclosed and claimed in the aforementioned copending Randolph application, in which pressure is suitably applied to the interior of the layed-up form of fiber matting by the introduction of a liquid into a flexible envelope surrounded by the matting and by a rigid exterior mold. In the present invention, air or other gas is employed as the pressure applying medium, instead of the liquid used by Randolph. A particularly important departure from the Randolph process is that pressure is initially applied to the matting in this manner and raised to a relatively high value before introducing the settable resin, and is then relieved to a relatively low value during introduction of the settable resin. Each of these departures from the Randolph method produces distinct advantages described hereinafter. Still other significant departures from the Randolph method are the addition of a resin-aerating step and a mold evacuating step, preferably just before introducing the settable resin, as also described hereinafter.

The invention reduces the cost of manufacturing large fiber-reinforced hollow tanks and similar objects, and such tanks are produced thereby which are more useful and durable than those of the prior art.

The general objects of the present invention are to avoid discontinuities in the fiber reinforcement of the tank structure so as to provide a substantially uniform distribution of interlocked fibers therethrough; to avoid air bubbles or pockets and similar discontinuities in the resin in which the reinforcing fibers are embedded so as to provide a reinforced resin mass of maximum strength and minimum porosity; and to provide a high density of interlocked fiber reinforcement throughout the tank body.

More specific objects of the invention, by which it is particularly distinguished from the method described and claimed in the aforementioned copending Randolph application, are: to achieve more uniform compaction of the reinforcing fibers, particularly in the regions where the side walls of a tank or the like merges into the end walls thereof; to reduce the amount of air entrained in the settable resin with which the reinforcing fibers are permeated; to more effectively eliminate air contained in the intersticial spaces of the fiber matting prior to its permeation with the resin; to speed up the fabricating operation and, as correlative benefits, to reduce the amount of heat that must be supplied and obtain greater production from the apparatus and manpower required to carry out the method.

These and other objects and advantages of the invention will become apparent from the following description of the invention, made by way of example. In the accompanying drawings which supplement the description:

Figure 9 is similar to Figure 1, but illustrates certain modifications of the invention as applied to the manufacture of open end tubes instead of closed end tanks.

Figure 10 is a plan view of a top mold closure plate for use in the manufacture of open end tubes.

Figure 11 is a plan view of a bottom mold closure plate for the same purpose.

Figure 12 is a cross-sectional view of the mold, the end closure plates, and an interior expandable bag assembled to enclose the porous fiber form shown in Figure 9 for impregnation with resin.

Figure 1:
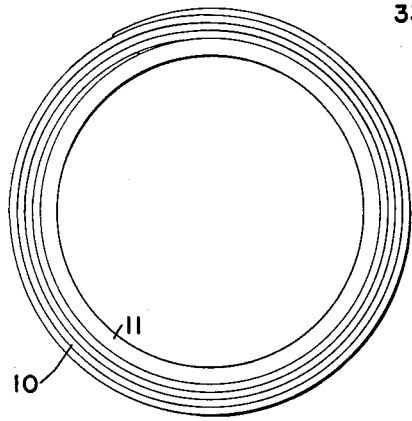
Figure 1 illustrates, somewhat schematically, an initial or preparatory step in the manufacture of fiber-reinforced hollow tanks according to the herein described example of the invention.
Figure 2:
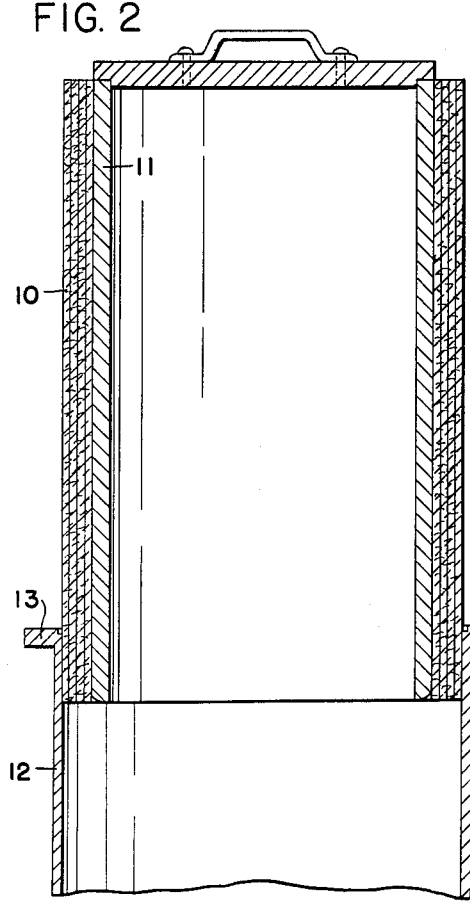
Figure 2 illustrates the insertion of a roll of fiber matting into a cylindrical mold section in a manner consistent with the practice of the herein described example of the invention.

The invention employs reinforcing fibers, such as glass fiber or equivalent material, suitably preformed into felted, woven, or otherwise interlocked mats or sheeting and shaped to conform to all or a portion of a mold cavity. For example, a mat of felted glass fibers or the like may be convolutely wound into a cylindrical body 10 on a form or core 11 and inserted in a cylindrical mold casing 12, as indicated in Figures 1 and 2. The form or core 11 is then withdrawn to leave the mold casing 12 lined with the convolutely wound fiber matting 10, more fully illustrated in the aforementioned copending Randolph application. The cylindrical mold casing 12 is provided with end flanges 13 which are adapted to close against cooperating flanges or other mold closure members to be described below.

When making a closed-end tank, fiber matting pieces in the shape of end wall caps 16 and 17, which may be identical except that the upper cap 16 has a central hole formed therein, are also provided. The caps 16 and 17 may be shaped by conventional means which will be known to those familiar with the fabrication of fiber-reinforced molded articles. For example, fibers may be blown over cup-shaped screens to form a cup-shaped mat, also more fully illustrated in the aforementioned copending Randolph application, and a resin adhesive may be sprayed as a light coating on the fibers as they accumulate on the screen to hold the fiber mat together during subsequent handling. The outer diameter of the caps 16 and 17 may be equal to the internal diameter of the convoluted mat 10 when it is positioned within the casing 12.

Upper and lower mold caps 20 and 21 are provided for closing the mold and shaping the end walls of a tank formed therein. Suitable flanges on these caps are adapted to close against the end flanges 13 of the cylindrical mold casing 12. The internal surfaces of the casing caps are in the shape of oblate ellipsoids of revolution, or they may be hemispherical. They may also have other shapes which, however, will be less adaptable to the production of a strong tank structure. This is important inasmuch as applications to which the invention relates must usually be capable of withstanding pressures in excess of 500 p.s.i. and pressures up to 1000 p.s.i. or higher may be required.

The inner surface of the upper casing cap 20 is centrally relieved as at 25 and is provided with a central annular rib 22 and with vent sleeves or passages 23. The flange of the upper casing cap is provided with a suitable sealing ring 24. The lower casing cap 21 is provided with a central resin supply line 26. A deep annular groove 27 is formed around the lower casing cap. A plurality of drains or sprues 28 open downwardly from the bottom of the annular groove 27. The flange associated with the lower casing cap is provided with a suitable sealing ring 29.

A flexible envelope is provided for expansion against the fiber lining. An orifice structure associated with this envelope is adapted to be inserted upwardly through the central opening in the upper fiber cap 16 and through a central opening in the casing cap 20, radially inwardly of the annular rib 22. The flexible envelope may comprise a rubber bag 30 encased in a protective sheath of polyvinyl acetate film, or cellophane film, or similar material which will protect the molding materials against chemical action of vulcanizing agents or residues thereof associated with the bag 30. The bag 30 and protective sheath 31 are supported on a flanged and threaded neck 32 and are sealed thereto by suitable washers and gaskets 33 which are clamped by tightening of nut 35 threadedly engaged on the outer end of the neck 32. When filled, but not dilated, the bag preferably has a volume approximately equal to the difference between the volume of the chamber defined by the casing members 12, 20 and 21 and the volume occupied by the mats 10, 16 and 17.

Figure 3:
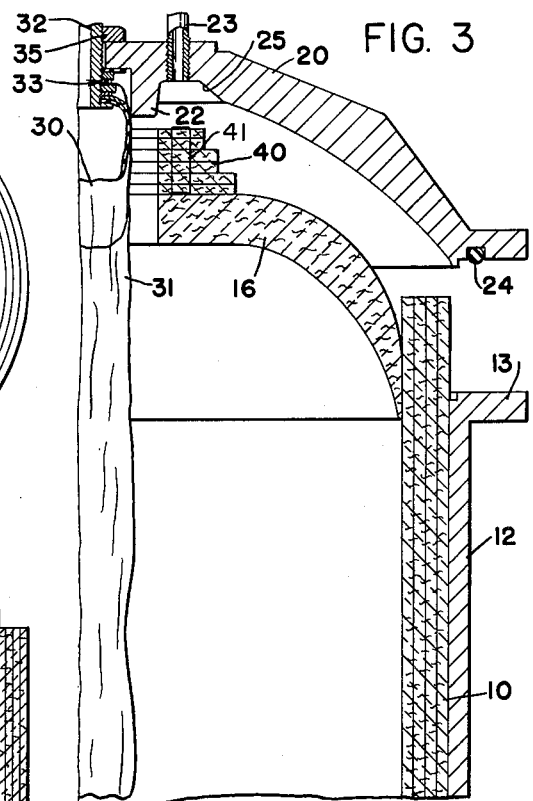
Figure 3 is a view in cross-section of the top righthand portion of molding apparatus embodying the practice of the invention, the mold sections being parted and fiber forms being inserted into place to be subsequently impregnated and molded according to the invention.

There are also provided round rings of fiber matting 40 of progressively varying sizes, which may be stitched together for convenience in handling, as shown at 41 in Figure 3.

Figure 4:
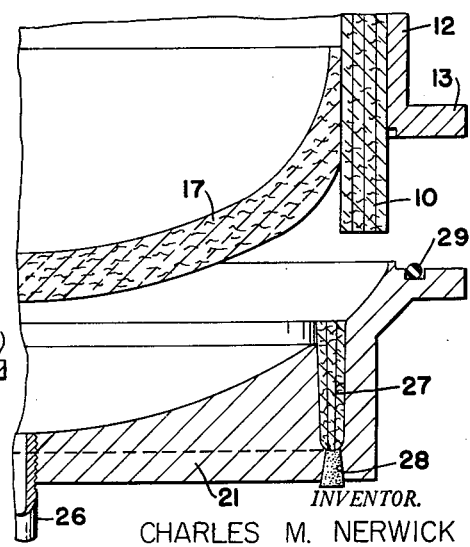
Figure 4 is a view similar to Figure 3, showing the lower right-hand portion of apparatus embodying the practice of the invention.

Prior to the molding operation, the convolutely wound fiber matting 10 is inserted in the cylindrical casing 12 as above described. The fiber caps 16 and 17 are then telescoped within the ends of the convolutely wound matting as indicated in Figures 3 and 4. A group of rings 40 is tacked around the central opening of the upper fiber cap 16 as indicated in Figure 3. The annular groove 27 in the lower cap 21 is stuffed with fiber as indicated in Figure 4. Thereupon, the casing members are closed together, and air or other gas is introduced into the envelope comprising the bag 30 to inflate it just enough to bring it into contact over its entire outer surface with the inner surface of the layed-up form of fiber matting.

At this point (when using liquid rather than gas to inflate the bag 30) it had previously been the practice to introduce liquid resin into the mold for impregnating the fiber matting. Instead, it is now preferred to continue introducing gas into the bag at a moderate rate until the interior gas pressure has been gradually raised to 25–30 p.s.i. or more, and then to relieve this pressure down to a relatively low value of about 5 to 10 p.s.i. before introducing the liquid resin. The purpose of this is to pre-compress the fiber matting as much as possible and, at this stage, to produce as much shifting or adjustment of the fibers as may be necessary for the initially separate mat portions to slide relative to one another in their regions of overlap in accommodating themselves to the contour of the mold sections while being so compressed. This seems to accomplish a minor, but nonetheless important, controlled redistribution or adjustment of the fibers in those regions of overlap, forcing the fibers more firmly into contact with the mold along the junctures 42 between the interior side and end walls of the mold where there are abrupt changes in the mold contours. It also seems to cause an interlocking of the fibers from opposite sides of the initial lap seams 50 between the side wall mat 10 and the end caps 16 and 17 so as to virtually obliterate or eliminate all trace of the seams 50 in the final product. The overall, end result is a more uniform distribution and compaction of the fibers and a more nearly homogeneous and uniform final product.

The above interlocking of fibers at the initial seams 50 produces such homogeneity of the fiber body across the seams that further uncontrolled migration of the mat portions on opposite sides of the seams after the liquid resin has been introduced is effectively eliminated. Previously, this tendency toward uncontrolled migration of fibers in the regions of the seams 50, after introducing the liquid resin, precluded satisfactory use of gas for inflating the bag 30 and required the use of liquid for that purpose as disclosed in the aforementioned Randolph application.

After such pre-compression and adjustment of the fibers, the gas pressure in the bag 30 is relieved down to, say 7 p.s.i. While holding this bag pressure constant and the mold chamber more nearly vertically disposed than horizontally (preferably vertical as shown), a measured amount of resin 45 is then introduced through the supply line 26. The amount of resin introduced is such that the charge will permeate the entire fiber lining during a subsequent compressing operation. Preferably, a slight excess of resin is provided. The introduction of a large excess of resin at this point is permissible but unnecessary, since it is subsequently expressed out of the mold during final compressing of the fiber matting before setting the resin.

The resin comprises any suitable thremosetting resin adapted to be set at temperatures above room temperature. It is preferred that a resin be employed that will set at about 200–220° F. Resins adaptable to the purposes herein described are well known to the art, and in general, high-temperature-resistant thermosetting resins of the type usually known as polyester resins, such as epoxy resins or styrene-phthalic anhydride condensation products, may be employed together with suitable setting agents adapted to control setting temperature, all as is well known in the art.

Figure 5:
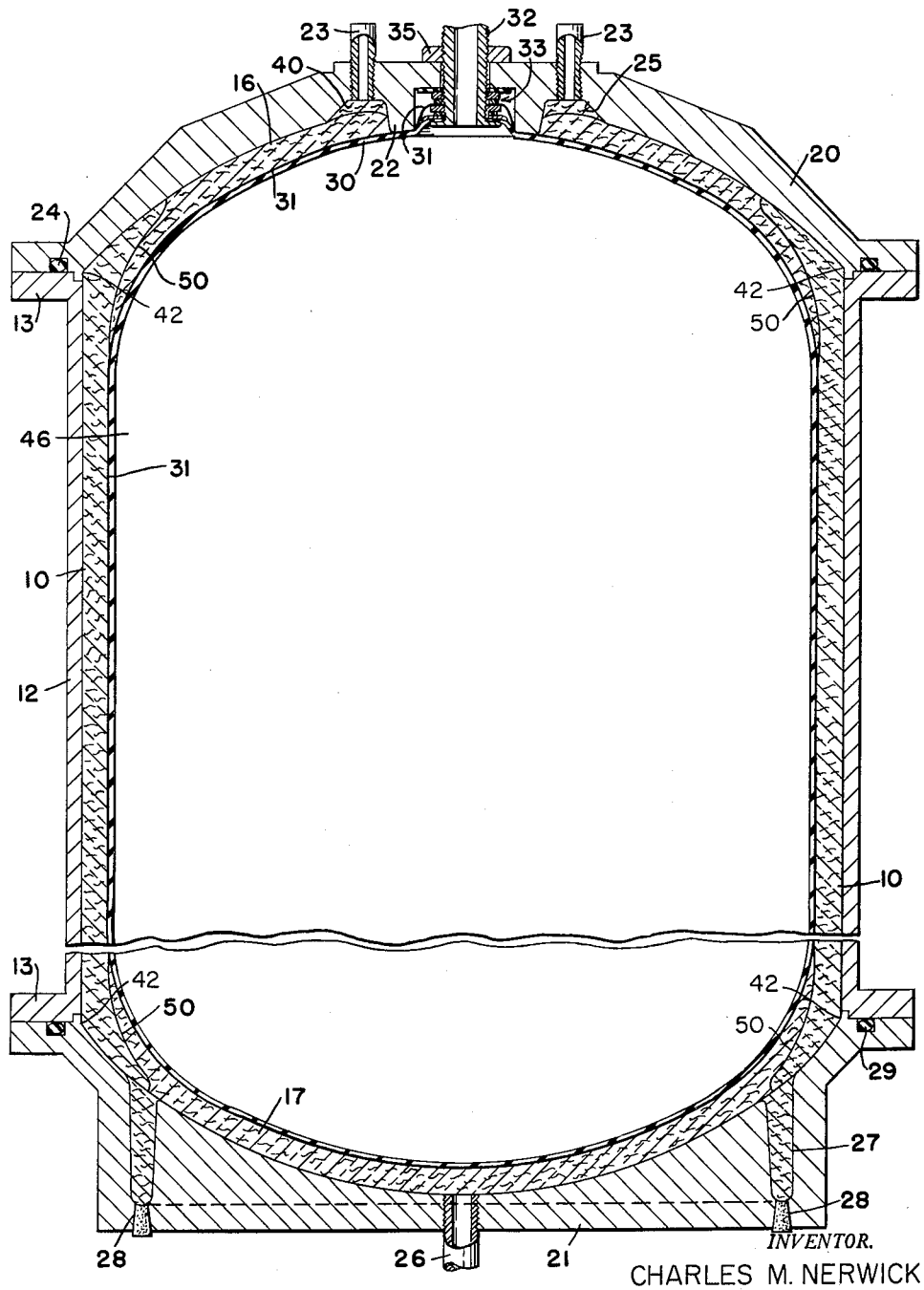
Figure 5 is a cross-sectional view showing molding apparatus embodying the practice of the invention with all mold sections closed and with a central expanding envelope almost fully expanded but with no resin as yet introduced into the mold.

As the resin is introduced into the bottom of the molding chamber, the upper vents 23 and lower drains 28 are open. As the resin rises around the bag 30, it forces air within the fiber matting out through both the upper vents 23 and lower drains 28 until the resin flows into the annular groove 27 and out through the lower drains. Thereupon the lower drains are plugged as shown in Figure 5 and the introduction of resin is continued. The rising column of resin displaces the air above it and continues to force it out of the upper vents 23, but at no time is the fiber lining wetted with resin ahead of the path of escaping air. The above prescribed air pressure within the bag 30 is sufficiently high to prevent billowing of the bag at the lower corners thereof or elsewhere and to thereby further restrain the fibers from migrating upwardly with the rising resin by maintaining firm contact of the envelope with the matting over the entire inner surface of the fiber lining. Such migration tendency is also reduced by the precompression of the fibers before the resin is introduced, as explained above.

Figure 6:
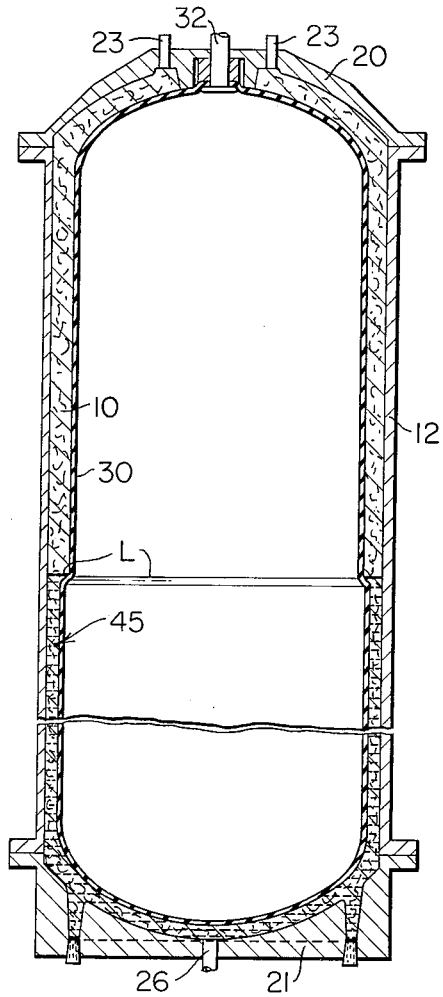
Figure 6 is a view similar to Figure 5 but more schematic in nature showing apparatus embodying the practice of the invention just following introduction of resin into the mold.

As hereinbefore noted, the liquid resin acts as a lubricant for the matted fibers. Such lubrication not only produces the previously troublesome tendency toward migration of the fibers, but it also renders the fibers more susceptible to further compaction due to the pressure in the bag 30. This latter effect is illustrated in Figure 6 with some exaggeration by showing the level L to which liquid resin has been introduced into the fiber mass, the fiber body below the level L where the fibers have been permeated and lubricated being compressed more than above the level L where the resin has not yet contacted the fibers. This transition zone rises as the level L is raised in the next step of the invention.

Additional pressure is now applied by slowly feeding additional gas into the flexible envelope comprising the bag 30 to cause substantial further compression of the fiber lining within the molding chamber and progressive reduction of its thickness. For example, a ½ inch fiber wall may be compressed to a final thickness of approximately 3/16 inch. Due to the resultant diminution of the volume of the fiber lining, the resin 45 is expressed upwardly throughout the entire fiber lining. There is preferably a slight excess of resin which is expressed outwardly through the upper vents 23, thus signalling that impregnation of the entire fiber lining is complete.

In some applications the above forming steps may be sufficient; however, in most applications it is preferred to complete final compression by removing plugs or caps from the drains or sprues 28, which had heretofore been closed, and thereupon slowly injecting additional gas into the bag to apply an additional and ultimate compressing pressure to the gas within the bag 30 to express additional excess resin both from the vents 23 and through the drains or sprues 28. This ultimate pressure is selected to produce the desired final wall thickness and desired final compaction of the fibers.

As previously indicated, one of the objectives of the invention is to minimize the entrainment of air in the resin with which the fiber body is impregnated. For this purpose, it has been found to be beneficial to subject the liquid resin to a de-aerating step before introducing it into the fiber body. The liquid resins of commerce contain relatively large quantities of air dispersed therein, some of it apparently being dissolved and some being merely finely dispersed as microscopic bubbles which may give only a slightly turbid appearance to an otherwise clear resin.

Such de-aerating may be performed by simply applying a vacuum above the resin in a suitable container until the entrained air has been largely drawn out of the resin. This produces a profusion of small bubbles in the body of the liquid resin, which bubbles rise rapidly to the surface and burst. A vacuum of 25 to 28 inches of mercury is highly effective for this purpose.

Once the resin has been de-aerated, it may be briefly exposed again to air or other gas for forcing the resin from the same container into the mold as described above without taking on any significant amount of additional air. If desired, however, any other procedures may be employed for protecting the de-aerated resin from contact with air or other gases while it is being forced into the mold.

A related objective of the invention, as noted above, is to more effectively eliminate air contained in the interstitial spaces of the fiber matting prior to its permeation with the resin. This may be done without first de-aerating the resin but, preferably, is done in conjunction therewith by evacuating the mold cavity through any suitable connection in the mold cap 20, such as an additional vent sleeve 23, while the others are suitably closed or capped and while the resin supply line 26 is connected through any suitable, valved conduit (not shown) to the bottom of the resin de-aerating container. By opening this valved conduit to flow of resin therethrough, the resin may be drawn into the mold in the desired amount by the vacuum in the mold, either by admitting air slowly into the top of the resin container to provide the necessary pressure differential or by gradually applying pressure to the resin in the resin container by any desired mechanical means, such as a piston, without exposing it to air or other gas. Obviously, drawing of the resin into the mold by vacuum, as described, will also draw dispsersed gas from the resin if the resin has not previously been de-aerated, or will draw additional dispersed gas therefrom in an amount depending upon the degree of vacuum created in the mold and the extent to which the resin may have been previously de-aerated. When the resin flow has been stopped, the resin in the mold may be expressed throughout the upper portion of the fiber body as before by the application of such pressure to the bag 30 as is needed for that purpose. Complete permeation of the fiber body may be detected, for example, when the resin has been expressed into the vacuum line through the uppermost vent sleeve 23 until it is visible in a transparent glass trap or the like (not shown) which may be provided in the vacuum line for that purpose. Thereupon, the vacuum line is disconnected from the sleeve 23 so that it is left open, and, optionally, the drains or sprues 28 are also opened in order to permit excess resin to be expressed out of the mold as the pressure in the bag 30 is raised to the desired final compressing pressure.

After the fiber body of the article has been thus impregnated and shaped within the mold, and while the shape is maintained by pressure from the envelope 30, the casing of the mold is subjected to heat in order to set the resin. Heating elements or heating coils (not shown) of conventional structure are provided adjacent the mold casing members, preferably in such a manner that uniform heating over all mold surfaces is achieved to as great a degree as possible, in a manner which will be familiar to those skilled in the art. Preferably, during heating of the mold and setting of the resin, the various vents 23 and drains or sprues 28 are plugged or capped.

After setting of the resin, the bag 30 is opened to the atmosphere to permit it to collapse and be withdrawn through the mouth or throat in the upper end of the formed article. For this purpose, the nut 35 may be turned off from the bag neck 32 and the casing cap 20 may be released from the casing 12 and removed. The lower casing cap 21 may then also be released from the casing 12 and removed, and the finished molded article may be slid longitudinally out of the casing 12.

It will be noted that the initial seams 50 between the fiber caps and the cylindrical fiber wall extend as tapered-lap seams across the corners or junctures between the end cap portions of the final product and the cylindrical side wall portions of the final product, and that these seams are permeated by a homogenous body of set resin to form an overall integral body. The matted fiber elements initially brought together on opposite sides of these seams have numerous outwardly projecting ends, and compression of the fiber body in the course of the above described steps causes considerable migration of the individual fibers throughout the fiber body. As previously explained, the result is that the finally set body is substantially homogenous, and, as a general rule, virtually no trace of the lap seams is detectable in cross-sections cut through these regions of the final product. The tapered-lap seams, by providing relatively large seam areas for interlocking of fibers and for adjustment of the fiber mats within the mold, contribute to the obtainment of this result.

During the final compressing operation, it is desirable that the gas forced into the bag 30 be supplied at a slow and, preferably, a constantly diminishing rate. A suitable adjustable air pressure regulator of any conventional type (not shown) may be provided in the pressure line to the bag 30 to closely control the increase in pressure by throttling the flow of gas into the bag 30. The rate of increase of the air pressure is preferably slower and slower as maximum compressing pressure is approached. In a typical application, an utilmate pressure differential between the inside of the bag 30 and the surrounding impregnated fibers may be of the order of 25 or 30 p.s.i., although higher or lower pressure differentials may be desired in different jobs.

During the application of heat to set the resin, the final pressure exerted by the bag 30 is preferably held substantially constant, and any drop in this pressure is particularly to be avoided, in order to insure that the impregnated mass remains immobile until curing of the resin has been completed. This requires that steps be taken to compensate for expansion of the gas in the bag as it absorbs heat during the setting of the resin. Such heat comes both from the external heating of the mold and from the exothermic setting reaction of the resin, which will generally raise the resin temperature above the temperature of the externally heated mold. The maximum resin temperature is generally reached and some subsequent cooling generally occurs before the resin is fully set, thus tending to cause contraction of the gas in the envelope 30 and reduction of the pressure exerted thereby while the resin is still in a pliable state. A slow increase in pressure, within limits, while the temperature in the bag is rising would not alone produce serious results. However, a subsequent decrease in pressure, due to a temperature drop before the resin is fully set, is apt to permit expansion of the compacted fibers so as to cause what might be loosely termed a delamination of the fiber and resin mass, leaving undesired voids and weak areas in the wall of the finished tank.

Thus, it is desirable during the resin curing step to maintain a substantially constant pressure differential between the inside and outside of the bag 30. This may readily be done in various way, as will be apparent to those skilled in the art. For example, using any source of relatively high, positive air pressure to maintain a predetermined, somewhat lower, final compressing pressure in the envelope, the pressure regulator mentioned above may be used in the supply line to keep the internal bag pressure up to the predetermined value while the temperature in the bag is falling; and, if desired, a conventional pressure relief valve (not shown) may be used in the same supply line between the pressure regulator and the bag for releasing gas from the bag in the event the pressure therein should rise excessively with increasing temperature during the resin curing operation.

When producing tanks in accordance with the procedures described and utilizing a final effective pressure in the bag 30 of 25 to 30 p.s.i., while the plugs 28 are removed and the passages 23 are also open, both before and during the setting of the impregnating liquid, substantial compression of the original fiber matting and discharge of excess resin occur. By reason of the lubrication of the loose fibers by the liquid impregnating resin while this pressure exists, the compaction of the fibers and discharge of excess resin are greatly facilitated, and a fiber content of about 40% to 50% by volume of the final tank body inherently results. By contrast, when fiber mats are preimpregnated with resin and the resin has been partially cured at normal pressures in accordance with certain practices in the art, after which the impregnated mats are shaped in a mold and subjected to heat and pressure to finish the curing of the resin, it is virtually impossible to obtain fiber contents in the finished product as high as 40%. Tanks formed with lower fiber contents are weaker in direct proportion to the difference in fiber content, other factors remaining the same. Therefore, the high fiber content of the tanks produced in accordance with the present invention is believed to be an important result of the invention.

Figure 7:
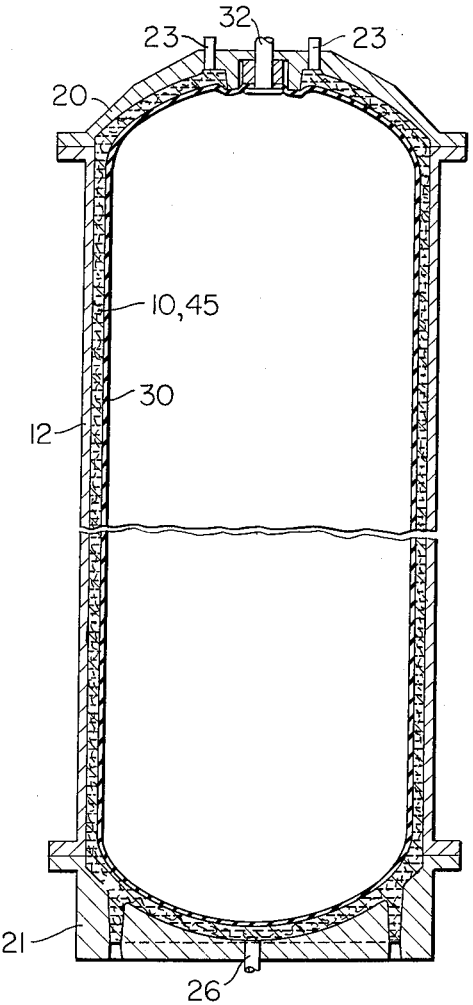
Figure 7 is a view similar to Figure 6 showing apparatus embodying the practice of the invention, following the step of compressing the fiber walls which have been laid up within the molding chamber and which have been impregnated with resin.
Figure 8:
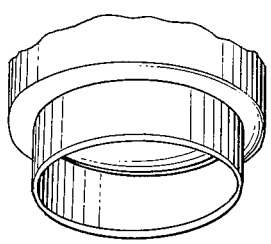
Figure 8 is a perspective view of the lower end of the tank showing a preferred foot construction on which the finished tank may rest.

Figures 6 and 7 are intended to illustrate, somewhat schematically, certain steps in the manufacture of articles according to the invention. Figure 6 shows apparatus employed in the invention prior to the final compressing or forming step. The fiber lining is moderately compressed, and the level L of the resin 45 may be slightly above the half-way height of the molding chamber at the conclusion of feed. Figure 7 shows the same apparatus and the fully impregnated lining subsequent to the final compressing or forming step and just prior to the step of heat setting the formed article.

The various fiber mattings and caps will most advantageously comprise glass fiber, due to the high strength properties of these fibers. The service life of articles formed in accordance with the general objects of the present invention can be further improved by forming each of such mattings and caps with an inner layer or lining of other types of fibers, such as acrylic fibers, for example, a copolymer of vinyl chloride and acrylonitrile formed as relatively fine fibers. In practice, the cylindrical body of fiber matting 10 shown in Figures 1 and 2 may be made by first rolling one or more layers of fibers of one type on the core 11, followed by rolling one or more layers of fibers of another type.

For the same reasons that a substantially homogeneous structure results at seams between initially separate matted fiber elements adjacent the ends of the tank, the fibers at the contiguous surfaces of each winding merge or migrate into one another across the several winding interfaces. Thus, all of these interfaces virtually disappear in the final steps of the process, and the transition from fibers of one type to fibers of the other type is a gradual one, no sudden change from fibers of one type to fibers of another being discernible and the fibers of the two types being intermingled in a transition zone. Similarly, in the fiber end caps 16 and 17, the transition in the final product from one type of fiber to the other is a gradual transition. As a result, except for such a gradual transition in the chemical composition and physical properties of the fibers between the inner and outer surfaces of the finished product, the body of the tanks is not only seamless throughout but is substantially homogeneous throughout. In the appended claims, the terms seamless and homogeneous are used in this sense.

As more fully explained in another application of Donald W. Randolph, Serial No. 704,028, filed December 20, 1957, other desirable features of tanks made in accordance with the present invention are that the tapered-lap seams 50 between the cylindrical side wall matting 10 and the end wall mattings 16 and 17 extend around and radially inwardly along the end walls to prevent excessive creeping of the matting in the side wall, and the foot structure joins the bottom wall of the tank at a circular zone that is concentric with the side wall, is of substantially smaller diameter than the side wall, and is spaced radially inwardly from the side wall a substantial distance.

Turning now to Figures 9–12, certain modifications of the invention are illustrated as applied to the production of open end, hollow cylindrical bodies, such as lengths of tubing. In general, the procedure for producing such bodies is similar to the procedure just described for making closed end tanks, but with certain variations, some of which are also applicable to the production of closed end tanks as will be apparent to those skilled in the art.

As shown in Figure 9, a cylindrical form of fiber matting, generally designated 60 may be wound on the same core 11 shown in Figure 2. In this case, however, in order to secure greater tensile strength in the composite cylindrical wall material of the final product, the form of fiber matting may be made up of one or more turns of felted glass fiber matting forming an inner felted layer 61, one or more turns of any conventional, woven, glass fiber fabric forming an intermediate layer 62, and one or more turns of the felted glass fiber matting forming an outer felted layer 63. The greater tensile strength that can be built into a suitable woven glass fabric, compared to the strength of a felted glass fiber matting, adds greatly to the tensile strength of the finished resin impregnated material.

Obviously, any desired arrangement of felted and woven, knitted, or netted fabric layers, or felted matting only, or other fabrics only, may be used without departing from the scope of the invention as claimed herein. However, there are distinct practical and economic advantages to the use of felted fiber matting to the extent that the requisite strength of the finished product for a given wall thickness will permit. The felted fiber matting, of course, is less expensive. In addition, it is more rigid before impregnation with resin and setting of the resin so that it is easier to position and hold in place in a mold during the process. Also, the randomly oriented individual filaments of matted fibers in each mat section, in regions of overlap between adjacent mat sections, project and merge into the adjacent mat section so as to more securely hold the separate mat sections against relative movement and so as to produce a more nearly homogeneous product in the regions of overlap. In addition, the multiple filament threads of which woven fabrics and the like are made are porous to a degree and contain some air, but these threads per se are not readily permeated with liquid resin. The greater permeability of felted fiber matting facilitates the flow of liquid resin about each individual filament so as to more completely impregnate the fiber body and drive the air therefrom.

When forming tubing as illustrated in Figures 9–12, the felted fiber matting layers 61 and 63 may advantageously project somewhat beyond each end of the cylindrical mold and be folded radially inwardly when closing the ends of the mold, as hereinafter described. The woven fabric layer 62, on the other hand, may have more stable, better defined dimensions so that it may be made in a width more closely corresponding to the axial length of the mold and may be more accurately wrapped on the core 11 with little or no irregularities at each end of the mold. If desired, an inner layer, or an outer layer, or both (not shown) of thin, preimpregnated and cured, glass fiber, surfacing mat may also be wrapped about the core 11 to provide smoother finished surfaces on the final article or to aid in holding an inner and/or outer layer of woven fabric in place, if such an arrangement of matting materials is desired.

The core 11, with the matting layers 61, 62, and 63 wrapped thereon is shown in Figure 9 after this assembly has been inserted in a cylindrical mold 65, similar to the mold section 12 of Figure 2. The core 11 is then slid out to leave the porous form in place in the mold. Thereupon, a bottom mold closure plate 66, and a top mold closure plate 67 having the same flexible bag 31 of Figure 4 similarly mounted thereon, are positioned to close the mold as shown in Figure 12 while folding the edges of the felted fiber layers 61 and 63 radially inwardly. The closure plates 66 and 67 are suitably clamped in place against gaskets 68 to securely seal the mold.

As shown in Figures 10, 11 and 12, the top closure plate 67 is provided with a central aperture 71 to receive the neck 32 of the bag 31 by which the bag is inflated after closing the mold. The top closure plate 67 is also provided with a pair of diametrically opposed vents or sprues 72 and 73 positioned for axial alignment with the fiber form in the mold to exhaust air and, finally, to exhaust excess resin therefrom. The bottom closure plate 66 is preferably provided with four vents or sprues 74, 75, 76, and 77, similarly located for also exhausting excess resin during final compression of the completely impregnated fiber form. The bottom plate is also provided with a central inlet tube 78 for introducing liquid resin into the mold.

When the mold has been closed about the fiber form and about the bag 31, as shown in Figure 12, the impregnating and molding operations may be performed in the same manner as in making closed end tanks according to Figures 1-7, except that the bottom vents 74, 75, 76, and 77 may be initially closed by suitable plugs (not shown) before introducing resin through the inlet tube 78. These vents 74, 75, 76 and 77 may remain closed until the resin has been expressed throughout the fiber form and some excess resin has been forced out of the top vents 72 and 73 by increasing the gas pressure in the bag 31. Thereupon, the vents 74, 75, 76, and 77 may be unplugged and remain open while the bag pressure is being raised to the final compressing pressure. As in making closed end tanks, all six of the vents 72, 73, 74, 75, 76 and 77 are preferably closed before applying heat to the mold to set the resin.

When the molding and resin curing operations are completed and the molded tube has been removed from the mold, it is a finished article except for the necessity for cropping off the irregular extremities of the tube. Obviously, the tube may be cut up into any shorter lengths which may be desired.

The above described examples of the invention may be varied without departing from the scope of the invention. For example, the central mold casing and the central portion of the tank need not necessarily be circular in cross-section, although generally a central portion of tubular shape is preferable. Also, the foot structure of the tank may take any of a variety of forms. Other possible modifications of the details of the invention as disclosed herein will suggest themselves. The invention is not limited to all such details, but is defined by the following appended claims.

What is claimed is:

1. A method of forming a hollow, fiber-reinforced, molded article, comprising the steps of providing a substantially closed rigid molding chamber lined with porous and compressible fiber matting that includes at least one layer of unwoven loosely felted fibers, expanding a flexible envelope disposed within said chamber into contact with said fiber matting, and creating a relatively high pressure differential between the inside and outside of said envelope sufficient to compress and compact said fiber matting and force it to conform to the mold in firm contact therewith, then reducing said pressure differential to a relatively low value to facilitate permeation of the fiber matting with liquid resin and investing a thermosetting liquid resin into the chamber in permeating relationship with at least a part of said fiber matting, slowly increasing said pressure differential to a final high value sufficient to gradually further compress said fiber matting while venting said molding chamber until gas therein and some excess resin are expressed through said venting from said chamber, and then applying heat to set the resin in permeating relationship with the fiber matting to form a substantially homogeneous, molded, hollow body of fiber-reinforced solidified resin.

2. A method of forming a hollow, fiber-reinforced, molded article, comprising the steps of providing a substantially closed rigid molding chamber lined with porous and compressible fiber matting that includes at least one layer of unwoven loosely felted fibers, expanding a flexible envelope disposed within said chamber into contact with said fiber matting, and creating a relatively high pressure differential between the inside and outside of said envelope sufficient to compress and compact said fiber matting and force it to conform to the mold in firm contact therewith, then reducing said pressure differential to a relatively low value to facilitate permeation of the fiber matting with liquid resin and investing a thermosetting liquid resin into the chamber in permeating relationship with at least a part of said fiber matting, slowly increasing said pressure differential to a final high value sufficient to gradually further compress said fiber matting while venting said molding chamber until gas therein and some excess resin are expressed through said venting from said chamber, and then applying heat to set the resin in permeating relationship with the fiber matting while maintaining said final high pressure to form a substantially homogeneous molded body of fiber-reinforced solidified resin.

3. A method of forming a substantially closed, hollow, fiber-reinforced, molded article having a cylindrical side wall, end walls, and an opening in one of said end walls, comprising providing a hollow rigid mold that defines a substantially closed cavity of corresponding shape and dimensions lined with a plurality of overlapped sections of preformed, porous, fiber matting over its entire interior surface except for the area of said end wall opening to form a fiber lining, each of said sections of fiber matting including at least one layer of unwoven loosely felted fibers, providing a flexible envelope inside said fiber lining and a filling conduit for the envelope communicating therewith and with the exterior of said mold through the area of said end wall opening, inflating said envelope within said chamber into contact with said fiber lining by introducing gas into the envelope through said filling conduit at a pressure in excess of that surrounding the envelope in said chamber, increasing the gas pressure in said envelope until a relatively high pressure differential is created that is sufficient to compress and compact said fiber lining and force it to conform to the mold in firm contact therewith, then relieving said pressure differential to a relatively low value to facilitate permeation of the fiber lining with liquid resin and investing a measured amount of a thermosetting liquid resin into the chamber in permeating relationship with a part only of said fiber lining, slowly increasing the pressure of gas in said envelope to further compress said fiber lining while venting said chamber until a final pressure differential is created on opposite sides of said envelope of sufficient magnitude to express from the chamber any gas therein and at least some excess resin, and then applying heat to set the resin in permeating relationship with the fiber lining while maintaining said final pressure differential to form a substantially homogeneous molded body of fiber-reinforced solidified resin.

4. A method of forming a hollow, fiber-reinforced, molded article, comprising the steps of providing a substantially closed rigid molding chamber lined with porous and compressible fiber matting that includes at least one layer of unwoven loosely felted fibers, expanding a gas filled flexible envelope within said chamber into pressure contact with said fiber matting, creating a relatively high pressure differential between the inside and outside of said envelope sufficient to compress and compact said fiber matting and force it to conform to the mold in firm contact therewith, then relieving said pressure differential to a relatively low value and investing a thermosetting liquid resin into the chamber in permeating relationship with at least a part of said fiber matting, slowly increasing said pressure differential to a final high value while venting said chamber to gradually compress the fiber matting and insure that said liquid resin is expressed throughout the same in permeating relationship therewith and that any gas therein and excess resin are expressed through said venting from said chamber, and then closing said venting and applying heat to set the resin in permeating relationship with the fiber matting to form a substantially homogeneous molded body of fiber-reinforced solidified resin.

5. A method of forming a hollow, fiber-reinforced, molded article, comprising the steps of providing a substantially closed rigid molding chamber lined with a cylindrical form of porous and compressible fiber matting to form a fiber lining that includes at least one layer of unwoven loosely felted fibers, expanding a gas filled flexible envelope within said chamber into contact with said fiber lining, creating a substantial pressure differential between a relatively high gas pressure within said envelope and a relatively low gas pressure in said fiber lining to initially compress the same against the molding chamber walls, relieving said pressure differential to a relatively low value and then investing a hardenable liquid resin into the chamber in permeating relationship with at least a part of said fiber lining, while venting said chamber, slowly increasing said pressure differential to a final high value while still venting said chamber to further compress said fiber lining and insure that said liquid resin is expressed throughout the same in permeating relationship therewith and air and excess resin are expressed through said venting from said chamber, and then, while maintaining said final high pressure differential setting said resin to a hardened state in permeating relationship with the fiber lining to form a substantially homogeneous, molded, hollow body of fiber-reinforced solidified resin.

6. A method of forming a hollow, fiber-reinforced, molded article, comprising the steps of providing a substantially closed, rigid, molding chamber lined with a porous and compressible mat comprising unwoven loosely felted fibers, expanding a gas filled flexible envelope within said chamber into contact with said mat, creating a substantial pressure differential between a relatively high gas pressure within said envelope and a relatively low gas pressure in said mat sufficient to initially compress and compact the same and force it to conform to the mold in firm contact therewith, reducing said pressure differential to a relatively low value to facilitate permeation of the fiber mat with liquid resin, investing a hardenable liquid resin into the chamber in permeating relationship with at least a part of said mat, slowly increasing said pressure differential to a final high value while venting said chamber to further compress said mat and insure that said liquid resin is expressed throughout the same in permeating relationship therewith and to exhaust gas and excess resin through said venting from said chamber, and then, while maintaining said final high pressure differential with said venting closed, setting said resin to a hardened state in permeating relationship with the mat to form a substantially homogeneous, molded, hollow body of fiber-reinforced solidified resin.

7. In the method of making fiber-reinforced resin articles, wherein porous fiber matting is disposed between a vented mold surface and a flexible membrane and is held in place against the mold surface by a pressure differential created on opposite sides of the membrane while introducing a settable liquid resin into a part of the fiber matting, and wherein said pressure differential is then increased to force gas from the matting and to permeate the pores thereof with resin by expressing the resin throughout the matting, the step of de-aerating the resin by subjecting it to a vacuum of the order of at least 25 inches of mercury before introducing it into the fiber matting.

8. In the method of making fiber-reinforced resin articles, wherein porous fiber matting is disposed between a vented mold surface and a flexible membrane and is held in place against the mold surface by a pressure differential created on opposite sides of the membrane while introducing a settable liquid resin into a part of the fiber matting, and wherein said pressure differential is then increased to force gas from the matting and to permeate the pores thereof with resin by expressing the resin throughout the matting, the steps of reducing the pressure in the fiber matting between the mold surface and the flexible membrane to create a vacuum therein for de-aerating the fiber matting and the liquid resin while drawing the resin into the matting, and finally increasing said pressure differential sufficiently to express the resin throughout the matting.

9. In the method of making fiber-reinforced resin articles, wherein porous fiber matting is disposed between a vented mold surface and a flexible membrance and is held in place against the mold surface by a pressure differential created on opposite sides of the membrane while introducing a settable liquid resin to a part of the fiber matting, and wherein said pressure differential is then increased to force gas from the matting and to permeate the pores thereof with resin by expressing the resin throughout the matting, the steps of de-aerating the resin by subjecting it to a vacuum of the order of at least 25 inches of mercury before introducing it into the fiber matting, reducing the pressure in the fiber matting between the mold surface and the flexible membrane to create a vacuum therein for de-aerating the fiber matting while drawing the resin into the matting, and finally increasing said pressure differential sufficiently to express the resin throughout the matting.

References Cited in the file of this patent
UNITED STATES PATENTS

| | | |
|---|---|---|
| 2,441,097 | Hicks | May 4, 1948 |
| 2,460,820 | Hagopian | Feb. 8, 1949 |
| 2,517,090 | Denning | Aug. 1, 1950 |
| 2,644,198 | Crawford | July 7, 1953 |
| 2,670,501 | Michiels | Mar. 2, 1954 |
| 2,773,287 | Stout | Dec. 11, 1956 |
| 2,815,534 | Ising et al. | Dec. 10, 1957 |
| 2,832,995 | McCaw | May 6, 1958 |
| 2,913,036 | Smith | Nov. 17, 1959 |
| 2,945,262 | Petty | July 19, 1960 |

OTHER REFERENCES

Vacuum Deposition on Thin Films—"The Degassing of Plastic Material in Vacuo"—chap. 2, pages 44–69, L. Holland, 1956.